(12) United States Patent
Nguyen et al.

(10) Patent No.: US 10,574,018 B2
(45) Date of Patent: Feb. 25, 2020

(54) CONDUCTIVE SLEEVED FASTENER ASSEMBLY

(71) Applicant: The Boeing Company, Chicago, IL (US)

(72) Inventors: Thu A. Nguyen, Mukilteo, WA (US); Michael G. Parent, Greenbank, WA (US); Russell J. Heeter, Sammamish, WA (US); Jeffrey A. Wilkerson, Bothell, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/667,439

(22) Filed: Mar. 24, 2015

(65) Prior Publication Data

US 2015/0200517 A1 Jul. 16, 2015

Related U.S. Application Data

(62) Division of application No. 13/728,804, filed on Dec. 27, 2012, now Pat. No. 9,003,650, which is a division
(Continued)

(51) Int. Cl.
*H01R 9/00* (2006.01)
*H01R 43/26* (2006.01)
(Continued)

(52) U.S. Cl.
CPC ............. *H01R 43/26* (2013.01); *B64D 45/02* (2013.01); *F16B 33/00* (2013.01); *H01R 43/00* (2013.01);
(Continued)

(58) Field of Classification Search
CPC .. B64D 45/02; F16B 33/00; F16B 2001/0064; F16B 19/02; Y10T 83/7705;
(Continued)

(56) References Cited

U.S. PATENT DOCUMENTS

3,130,991 A 4/1964 Renato
3,355,205 A 11/1967 Wagner et al.
(Continued)

FOREIGN PATENT DOCUMENTS

CN 101153623 A 4/2008
CN CN101925517 A 12/2010
(Continued)

OTHER PUBLICATIONS

ARP5577 "Aircraft Lightning Direct Effects Certification" http://standards.sae.org/arp5577/, Sep. 30, 2002, 1 page.
(Continued)

*Primary Examiner* — Thiem D Phan
(74) *Attorney, Agent, or Firm* — Parsons Behle & Latimer

(57) ABSTRACT

A conductive sleeved fastener assembly includes an electrically-conductive fastener having a fastener head and a fastener shank extending from the fastener head and an electrically-conductive fastener sleeve receiving the fastener shank of the fastener and a fastener sleeve flange provided on the fastener sleeve and disposed in direct contact with the fastener head of the fastener. A method of preparing a conductive sleeved fastener for use is also disclosed.

20 Claims, 2 Drawing Sheets

Related U.S. Application Data of application No. 12/272,553, filed on Nov. 17, 2008, now Pat. No. 8,382,413.

(51) Int. Cl.
| | |
|---|---|
| *B64D 45/02* | (2006.01) |
| *F16B 33/00* | (2006.01) |
| *H01R 43/00* | (2006.01) |
| *F16B 13/00* | (2006.01) |
| *F16B 1/00* | (2006.01) |
| *H01R 4/64* | (2006.01) |

(52) U.S. Cl.
CPC ............ *H01R 43/002* (2013.01); *F16B 13/00* (2013.01); *F16B 2001/0064* (2013.01); *H01R 4/64* (2013.01); *Y10T 29/49117* (2015.01); *Y10T 29/49147* (2015.01); *Y10T 29/49885* (2015.01); *Y10T 29/49915* (2015.01); *Y10T 29/49938* (2015.01)

(58) Field of Classification Search
CPC ........... Y10T 29/49963; Y10T 403/645; Y10T 279/17957; Y10T 29/49945; Y10T 403/32598; Y10T 29/49147; Y10T 403/32909
USPC ...... 29/842, 458, 509, 510, 517, 522.1, 825; 411/3, 43, 82, 167, 258, 339, 361, 383, 411/416, 428, 432, 914
See application file for complete search history.

(56) References Cited

U.S. PATENT DOCUMENTS

| | | | |
|---|---|---|---|
| 3,461,769 | A | 8/1969 | Brosseit |
| 3,485,132 | A | 12/1969 | Hanny et al. |
| 3,498,352 | A | 3/1970 | Duffy |
| 3,639,137 | A | 2/1972 | Marinelli |
| 3,653,675 | A | 4/1972 | Schaffer |
| 3,667,340 | A | 6/1972 | Black et al. |
| 3,746,068 | A | 7/1973 | Deckert et al. |
| 3,820,297 | A | 6/1974 | Hurd |
| 3,835,612 | A | 9/1974 | Beziat |
| 3,835,615 | A | 9/1974 | King |
| 4,023,882 | A | 5/1977 | Pettersson |
| 4,102,036 | A | 7/1978 | Salter |
| 4,260,005 | A | 4/1981 | Stencel |
| 4,405,256 | A | 9/1983 | King, Jr. |
| 4,556,439 | A | 12/1985 | Bannink, Jr. |
| 4,755,904 | A | 7/1988 | Brick |
| 4,850,771 | A | 7/1989 | Hurd |
| 5,123,792 | A | 6/1992 | Strobel |
| 5,141,373 | A | 8/1992 | Kendall |
| 5,391,028 | A | 2/1995 | Charles |
| 5,577,854 | A | 11/1996 | Jacob et al. |
| 5,860,778 | A | 1/1999 | Keener |
| 5,895,186 | A | 4/1999 | Giannuzzi et al. |
| 6,149,363 | A | 11/2000 | March |
| 6,305,991 | B1 | 10/2001 | Gerster |
| 6,357,953 | B1 | 3/2002 | Ballantyne |
| 6,776,566 | B2 | 8/2004 | Kobusch et al. |
| 7,195,437 | B2 | 3/2007 | Sakamoto |
| 7,695,226 | B2 * | 4/2010 | March ...................... F16B 5/02 411/339 |
| 7,898,785 | B2 | 3/2011 | Winter et al. |
| 7,950,885 | B2 | 5/2011 | Rosenkranz |
| 8,312,606 | B2 | 11/2012 | Reid et al. |
| 8,382,413 | B2 | 2/2013 | Nguyen et al. |
| 8,475,102 | B2 | 7/2013 | Haylock et al. |
| 9,331,402 | B2 | 5/2016 | Heeter et al. |
| 9,343,824 | B2 | 5/2016 | Heeter et al. |
| 2004/0005207 | A1 | 1/2004 | Wallace |
| 2008/0075555 | A1 | 3/2008 | March et al. |
| 2009/0178262 | A1 | 7/2009 | Reid et al. |
| 2010/0124472 | A1 | 5/2010 | Nguyen et al. |
| 2011/0142567 | A1 | 6/2011 | Haylock et al. |
| 2013/0124472 | A1 | 5/2013 | Srivastava et al. |

FOREIGN PATENT DOCUMENTS

| | | |
|---|---|---|
| CN | 102042288 A | 5/2011 |
| CN | 102555329 A | 7/2012 |
| DE | 2306891 B1 | 10/1973 |
| EP | 1903221 | 3/2008 |
| JP | 2013224142 | 10/2013 |
| JP | 2013249917 | 12/2013 |
| WO | WO8705976 | 10/1987 |
| WO | WO198705976 A1 | 10/1987 |
| WO | 1999051494 | 10/1999 |
| WO | WO2011050040 | 4/2011 |

OTHER PUBLICATIONS

ARP5412 "Aircraft Lightning Environment and Related Test Waveforms" http://standards.sae.org/arp5412/, Nov. 1, 1999; 1 page.
U.S. Patent and Trademark Office; Office Action for U.S. Appl. No. 13/728,804 dated Dec. 19, 2013.
International Searching Authority; ISR-WO for Serial No. PCT/US2013/077387 dated Mar. 21, 2014.
International Searching Authority; ISR-WO for Serial No. PCT/2013/077087 dated Feb. 28, 2014.
U.S. Patent and Trademark office; Office Action for U.S. Appl. No. 12/272,553 dated Jul. 6, 2011.
U.S. Patent and Trademark Office; Office Action for U.S. Appl. No. 12/272,553 dated Sep. 14, 2011.
U.S. Patent and Trademark Office; Office Action for U.S. Appl. No. 12/272,553 dated Feb. 15, 2012.
U.S. Patent and Trademark Office; Office Action for U.S. Appl. No. 12/272,553 dated Jun. 19, 2012.
U.S. Patent and Trademark Office; Final Office Action for U.S. Appl. No. 13/728,804 dated Aug. 1, 2014.
U.S. Patent and Trademark Office; Advisory Action for U.S. Appl. No. 13/728,804 dated Nov. 5, 2014.
U.S. Patent and Trademark Office; Office Action for U.S. Appl. No. 13/758,612 dated Nov. 6, 2014.
U.S. Patent and Trademark Office; Office Action for U.S. Appl. No. 13/758,612 dated Jan. 16, 2015.
U.S. Patent and Trademark Office; Office Action for U.S. Appl. No. 13/758,539 dated Mar. 12, 2015.
U.S. Patent and Trademark Office; Final Office Action; U.S. Appl. No. 13/758,612; dated Apr. 13, 2015.
U.S. Patent and Trademark Office; Office Action; U.S. Appl. No. 13/758,612; dated Jun. 23, 2015.
U.S. Patent and Trademark Office; Office Action; U.S. Appl. No. 15/156,071 dated May 19, 2017.
U.S. Patent and Trademark Office; Office Action; U.S. Appl. No. 15/156,071; dated Oct. 25, 2017.
U.S. Patent and Trademark Office; Office Action; U.S. Appl. No. 13/758,539; dated Sep. 1, 2015.
U.S. Patent and Trademark Office; Office Action; U.S. Appl. No. 15/138,524; dated Jun. 28, 2017.
U.S. Patent and Trademark Office; Final Office Action; U.S. Appl. No. 15/138,524; dated Nov. 22, 2017.
The State Intellectual Property Office of the People's Republic of China; First Office Action; China Application No. 2013800722656; dated Jun. 27, 2016.
The International Bureau of WIPO; International Preliminary Report on Patentability; PCT Application No. PCT/US2013/077387; dated Aug. 13, 2015.
The International Bureau of WIPO; International Preliminary Report on Patentability; PCT Application No. PCT/US2013/077087; dated Aug. 13, 2015.
Japan Patent Office; Office Action; Japan Patent Application No. 2015-556011; dated Nov. 16, 2017.

* cited by examiner

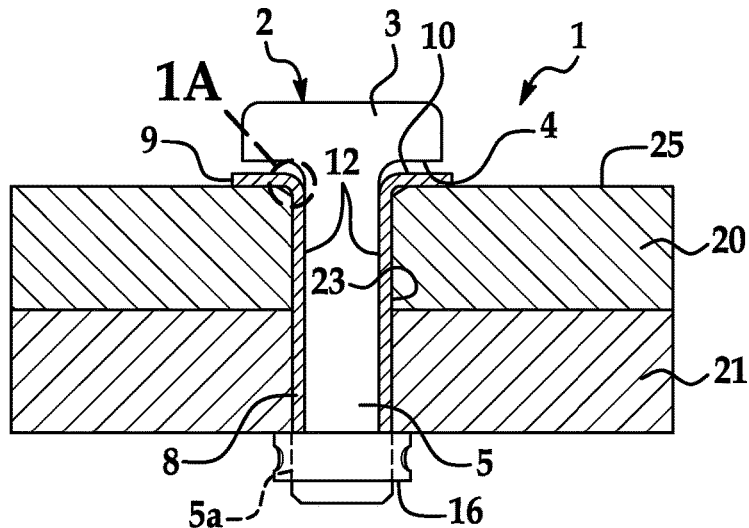

FIG. 1

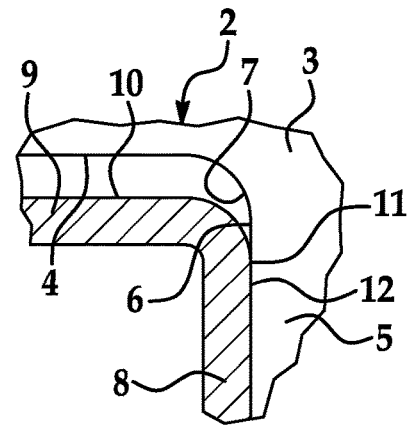

FIG. 1A

```
                                                            200
                                                              202
┌─────────────────────────────────────────────────────────────┐
│ PROVIDE FASTENER HAVING FASTENER HEAD, FASTENER SHANK       │
│ EXTENDING FROM FASTENER HEAD, FASTENER SLEEVE ON FASTENER   │
│ SHANK AND SLEEVE FLANGE ON FASTENER SLEEVE                  │
└─────────────────────────────────────────────────────────────┘
                              │
                              ▼                              204
┌─────────────────────────────────────────────────────────────┐
│ APPLY LUBRICANT(S) TO FASTENER SHAFT OF FASTENER AND/OR     │
│ TO INTERIOR SURFACE OF SLEEVE SHANK                         │
└─────────────────────────────────────────────────────────────┘
                              │
                              ▼                              206
┌─────────────────────────────────────────────────────────────┐
│ MAINTAIN FASTENER HEAD AND SLEEVE FLANGE FASTENER SLEEVE    │
│ DEVOID OF LUBRICANTS AND CHEMICALS                          │
└─────────────────────────────────────────────────────────────┘
```

FIG. 2

CONDUCTIVE SLEEVED FASTENER ASSEMBLY

This application is a divisional of U.S. patent application Ser. No. 13/728,804 filed Dec. 27, 2012, and entitled "Conductive Sleeved Fastener Assembly," which is a divisional of U.S. patent application Ser. No. 12/272,553 filed Nov. 17, 2008, and entitled "Conductive Sleeved Fastener Assembly," which is now U.S. Pat. No. 8,382,413, the disclosures of which are both hereby incorporated by reference in their entirety.

TECHNICAL FIELD

The disclosure relates to fasteners for fastening structures to each other. More particularly, the disclosure relates to a conductive sleeved fastener assembly which provides an electrically-conductive interface between a fastener sleeve and a fastener while maintaining lubricity requirements.

BACKGROUND

In some aerospace applications, it may be desirable to secure structures to each other using a fastener. A fastener having a diameter which is greater than the diameter of a fastener opening provided in the structures to be secured may be forced into the fastener opening to achieve an interference fit of the fastener in the fastener opening. A lubricant such as cadmium, for example and without limitation, may be coated on the fastener shank to provide the necessary lubricity to insert the fastener in the fastener opening and maintain conductivity between the fastener shank and the structures. In the case of composite structures and titanium structures, however, it may be desirable to use a sleeved fastener.

In order to reliably install a sleeved fastener into sleeve openings provided in the structures, it may be necessary to lubricate the shank of the fastener. In some applications, multiple lubricants may be applied to the fastener shank to lubricate the fastener shank in the sleeve. The lubricant(s) may be applied to the fastener shank and/or to the interior surface of the sleeve. The lubricants may electrically insulate the fastener from the fastener sleeve. In some applications, it may be desirable to enhance the electrical conductivity between the fastener and the fastener sleeve.

Therefore, a conductive sleeved fastener assembly which provides an electrically-conductive interface between a fastener sleeve and a fastener while maintaining lubricity requirements may be desirable for some applications.

SUMMARY

The disclosure is generally directed to a conductive sleeved fastener assembly. An illustrative embodiment of the sleeved fastener assembly includes an electrically-conductive fastener having a fastener head and a fastener shank extending from the fastener head and an electrically-conductive fastener sleeve receiving the fastener shank of the fastener and a fastener sleeve flange provided on the fastener sleeve and disposed in direct contact with the fastener head of the fastener.

The disclosure is further generally directed to the method of preparing a conductive sleeved fastener for use. An illustrative embodiment of the conductive sleeved fastener includes providing a fastener having a fastener head, a fastener shank extending from the fastener head, a fastener sleeve provided on the fastener shank and a sleeve flange on the fastener sleeve; applying a lubricant to the fastener shank of the fastener; maintaining the fastener head of the fastener and the sleeve flange of the fastener sleeve devoid of the lubricant; and placing the fastener head of the fastener in direct electrically-conductive contact with the sleeve flange of the fastener sleeve.

BRIEF DESCRIPTION OF THE ILLUSTRATIONS

FIG. 1 is a sectional view of a conductive sleeved fastener assembly in which one of a first composite structure and a first metal structure is fastened to one of a second composite structure and a second metal structure.

FIG. 1A is an enlarged sectional view, taken along section line 1A in FIG. 1.

FIG. 2 is a flow diagram which illustrates an illustrative method of preparing a conductive sleeved fastener for use.

DETAILED DESCRIPTION

Figure 3:
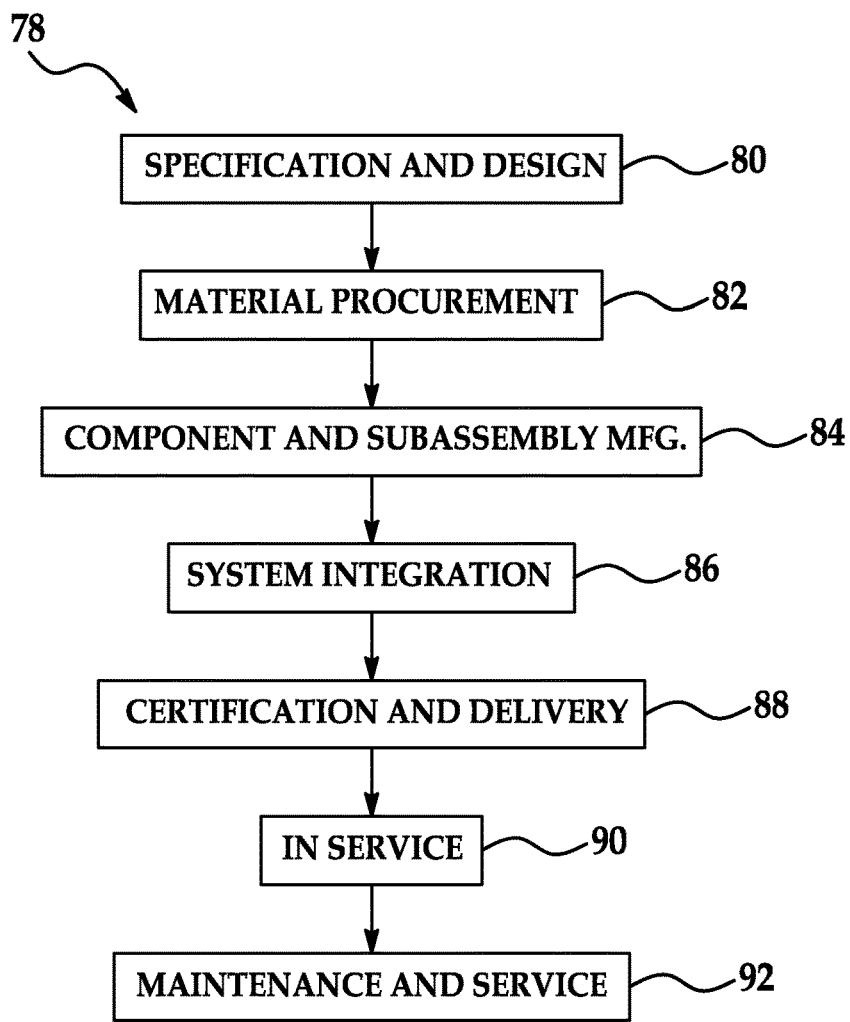
FIG. 3 is a flow diagram of an aircraft production and service methodology.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the invention and are not intended to limit the scope of the invention which is defined by the claims. Furthermore, there is no intention to be bound by any expressed or implied theory presented in the preceding technical field, background, brief summary or the following detailed description.

Referring initially to FIGS. 1 and 1A, an illustrative embodiment of the conductive sleeved fastener assembly, hereinafter assembly, is generally indicated by reference numeral 1. The assembly 1 is suitable for attaching a first composite structure 20 to a second composite structure 21. The assembly 1 may include a generally elongated, cylindrical, electrically-conductive fastener sleeve 8 having an outwardly-extending, annular fastener sleeve flange 9. The fastener sleeve 8 is extended through a bolt opening 23 provided in the first composite structure 20 and the second composite structure 21. The fastener sleeve flange 9 of the fastener sleeve 8 may engage an outer surface 25 of the first composite structure 20.

An electrically-conductive fastener 2 may include a fastener head 3 and a fastener shank 5 which extends from the fastener head 3. The surface of the fastener head 3 may be a bare metal surface without a coating or solid film lubricant. The fastener shank 5 of the fastener 2 may extend through the fastener sleeve 8 and the fastener head 3 may engage the fastener sleeve 9. The fastener head 3 may have a contact surface 4 which is disposed in direct engagement with a fastener sleeve contact surface 10 on the fastener sleeve when the fastener 2 fully engages the fastener sleeve 9. As shown in FIG. 1, a shank portion 5a of the fastener shank 5 may extend beyond the second composite structure 21 and may receive a nut 16 which may be tightened against the second composite or metal structure 21.

As shown in FIG. 1A, wherein the fastener 2 only partially engages the fastener sleeve 9, the fastener shank 5 may have a conductive fastener shank contact surface 6 which may be disposed in direct engagement with a conductive fastener sleeve contact surface 11 on the interior of the fastener sleeve flange 9. A lubricant 12 may be interposed between the contact interface between the fastener shank 5 and the fastener sleeve 8 to facilitate optimal insertion of the fastener shank 5 into the fastener sleeve 8. In some embodiments, the lubricant 12 may include a single lubricant or any combination of solid film lubricants and/or other lubricants that are suitable for use between the fastener shank 5 and the fastener sleeve 8 to sufficiently reduce the installation force necessary to insert the fastener shank 5 into the fastener sleeve 8. Cetyl alcohol is one example of a lubricant which may be suitable as the lubricant 12. The lubricant 12 and/or dielectric coatings (not shown) may be omitted from the interface between the fastener head contact surface 4 and the sleeve contact surface 10 and may additionally be omitted from the interface between the fastener shank contact surface 6 and the fastener sleeve contact surface 11. Accordingly, an electrical conductivity pathway may be established between the fastener head 3 and the fastener sleeve flange 9 at the interface between the fastener head contact surface 4 and the sleeve contact surface 10. An electrical conductivity pathway may also be also established between the fastener shank 5 and the fastener sleeve 8 at the interface between the fastener shank contact surface 6 and the fastener sleeve contact surface 11. This may increase the sparking threshold between the fastener 2 and the fastener sleeve 8 and fastener sleeve flange 9 in the event that an electrical current is directly applied to the fastener 2 or in the event that current travels through the first structure 20 and/or the second structure 21. The lubricant 12 may impart electrical resistance between the fastener sleeve 8 and the fastener shank 5.

Referring next to FIG. 2, a flow diagram 200 which illustrates an illustrative method of preparing a conductive sleeved fastener for use is shown. In block 202, a fastener is provided. The fastener may include a fastener head, a fastener shank extending from the fastener head, a fastener sleeve provided on the fastener shank and a sleeve flange provided on the fastener sleeve. A fillet may adjoin the fastener head and the fastener shank. In block 204, one or more lubricants may be applied to the fastener shank of the fastener and/or to the interior surface of the sleeve shank. In some applications, the lubricant(s) may be applied to the entire fastener may be coated or lubricated as selective finishing requires additional work and/or flow. In some embodiments, the lubricants may include a single lubricant or any combination of solid film lubricants and/or other lubricants that are suitable for use between the fastener shank and the fastener sleeve to sufficiently reduce the installation force necessary to insert the fastener shank into the fastener sleeve. Cetyl alcohol is one example of a lubricant which may be suitable as the lubricant. The sleeve flange of the fastener sleeve may remain devoid of solid film lubricant. In block 206, the fastener head and fillet radius of the fastener and the sleeve flange of the fastener sleeve may remain devoid of the lubricants and/or dielectric coatings. In subsequent steps, the fastener sleeve may be extended through registering sleeve openings provided in a first composite structure and a second composite structure and a nut may be threaded on a threaded shank portion provided on the fastener shank of the fastener and tightened. Electrical conductivity pathways may be established and the sparking threshold reduced between the fastener head and the sleeve flange of the fastener sleeve and between the fillet radius of the fastener and the sleeve flange.

Figure 4:
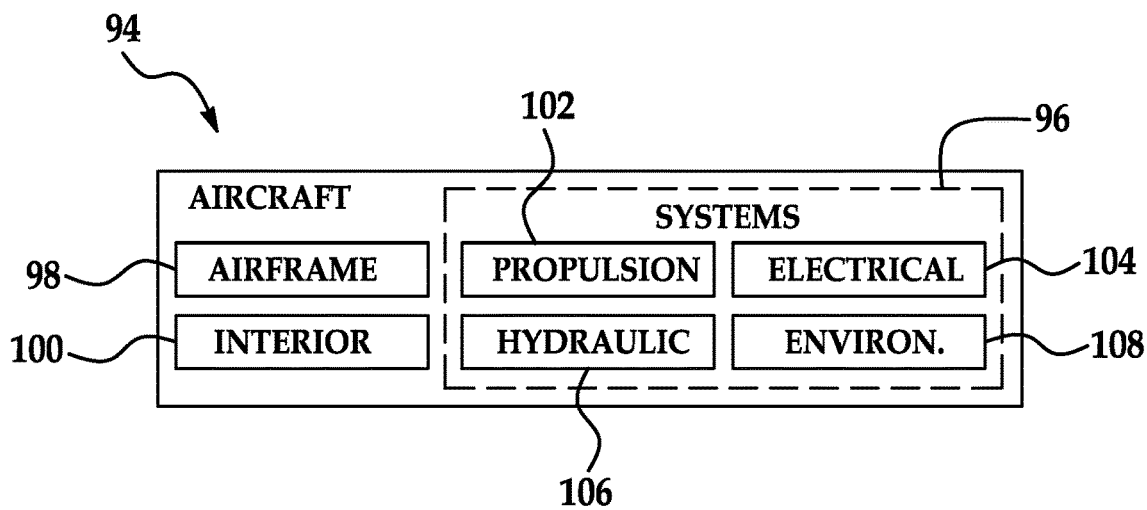
FIG. 4 is a block diagram of an aircraft.

Referring next to FIGS. 3 and 4, embodiments of the disclosure may be used in the context of an aircraft manufacturing and service method 78 as shown in FIG. 3 and an aircraft 94 as shown in FIG. 4. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 4, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the invention may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also, one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of attaching a first composite structure to a second composite structure comprising:
   positioning an electrically-conductive fastener sleeve within a bolt opening in a first composite structure and a bolt opening in a second composite structure;
   engaging an outer surface of the first composite structure with a flange of the electrically-conductive fastener sleeve;
   applying a lubricant to a shank of an electrically-conductive fastener while omitting the lubricant from a fillet adjoining a head of the electrically-conductive fastener and the shank, the shank extending from the head;
   inserting the shank of the electrically-conductive fastener into the electrically-conductive fastener sleeve after applying the lubricant to the shank of the electrically-conductive fastener, wherein a portion of the shank of the electrically-conductive fastener extends beyond the second composite structure; and establishing an electrical conductivity pathway between the electrically-conductive fastener and the electrically-conductive fastener sleeve by engaging a contact surface on the shank with a contact surface on the electrically-conductive fastener sleeve to create a contact interface.

2. The method of claim 1, wherein the lubricant is omitted from a contact surface on the head of the electrically-conductive fastener.

3. The method of claim 1, wherein establishing the electrical conductivity pathway further comprises engaging a contact surface on the head of the electrically-conductive fastener with the contact surface on the electrically-conductive fastener sleeve and engaging a contact surface on a fillet radius of the shank with the contact surface on the electrically-conductive fastener sleeve.

4. The method of claim 1, further comprising threading a nut onto the portion of the shank of the electrically-conductive fastener that extends beyond the second composite structure.

5. The method of claim 1, further comprising maintaining the head of the electrically-conductive fastener and the flange of the electrically-conductive fastener sleeve devoid of the lubricant.

6. The method of claim 1, wherein applying the lubricant to the shank of the electrically-conductive fastener further comprises applying a solid film lubricant to the shank of the electrically-conductive fastener.

7. The method of claim 1, wherein applying the lubricant to the shank of the electrically-conductive fastener further comprises applying a first lubricant to the shank and applying a second lubricant to the shank.

8. The method of claim 7, wherein the first lubricant is cetyl alcohol and the second lubricant is a solid film.

9. The method of claim 1, further comprising increasing a spark threshold between the electrically-conductive fastener and the electrically-conductive fastener sleeve.

10. The method of claim 1, wherein the lubricant imparts electrical resistance between the electrically-conductive fastener and the electrically-conductive fastener sleeve.

11. The method of claim 1, wherein applying the lubricant to the shank of the electrically-conductive fastener further comprises applying a coating lubricant to the shank of the electrically-conductive fastener.

12. The method of claim 1, further comprising applying lubricant to an interior surface of the electrically-conductive fastener sleeve.

13. A method of attaching a first composite structure to a second composite structure comprising:

positioning an electrically-conductive fastener sleeve within a bolt opening in a first composite structure and a bolt opening in a second composite structure;

engaging an outer surface of the first composite structure with a flange of the electrically-conductive fastener sleeve;

applying a lubricant to a shank of an electrically-conductive fastener, the shank extending from a head of the electrically-conductive fastener;

inserting the shank of the electrically-conductive fastener into the electrically-conductive fastener sleeve after applying the lubricant to the shank of the electrically-conductive fastener, wherein a portion of the shank of the electrically-conductive fastener extends beyond the second composite structure; and establishing an electrical conductivity pathway between the electrically-conductive fastener and the electrically-conductive fastener sleeve, wherein applying the lubricant to the shank of the electrically-conductive fastener further comprises applying a first lubricant to the shank and applying a second lubricant to the shank, and wherein the first lubricant is cetyl alcohol and the second lubricant is a solid film.

14. The method of claim 13, further comprising maintaining the head of the electrically-conductive fastener and the flange of the electrically-conductive fastener sleeve devoid of the lubricant.

15. The method of claim 13, further comprising maintaining a fillet adjoining the head and the shank of the electrically-conductive fastener devoid of the lubricant.

16. The method of claim 13, wherein the lubricant imparts electrical resistance between the electrically-conductive fastener and the electrically-conductive fastener sleeve.

17. A method of attaching a first composite structure to a second composite structure comprising:

positioning an electrically-conductive fastener sleeve within a bolt opening in a first composite structure and a bolt opening in a second composite structure;

engaging an outer surface of the first composite structure with a flange of the electrically-conductive fastener sleeve;

applying a lubricant to a shank of an electrically-conductive fastener while omitting the lubricant from a fillet adjoining a head of the electrically-conductive fastener and the shank, the shank extending from the head; and inserting the shank of the electrically-conductive fastener into the electrically-conductive fastener sleeve, wherein a portion of the shank of the electrically-conductive fastener extends beyond the second composite structure.

18. The method of claim 17, wherein the shank of the electrically-conductive fastener is inserted into the electrically-conductive fastener sleeve after applying the lubricant to the shank of the electrically-conductive fastener.

19. The method of claim 17, wherein inserting the shank of the electrically-conductive fastener into the electrically-conductive fastener sleeve further comprises establishing an electrical conductivity pathway between the electrically-conductive fastener and the electrically-conductive fastener sleeve.

20. The method of claim 19, wherein establishing the electrical conductivity pathway further comprises engaging a contact surface on the head of the electrically-conductive fastener with a contact surface on the electrically-conductive fastener sleeve and engaging a contact surface on a fillet radius of the shank with a contact surface on the electrically-conductive fastener sleeve.

* * * * *